US010284663B2

(12) United States Patent
Le Huerou et al.

(10) Patent No.: US 10,284,663 B2
(45) Date of Patent: May 7, 2019

(54) MODULE AND A METHOD FOR COLLECTING NON-DECLARATIVE INFORMATION AND IMPLEMENTED BY A TELECOMMUNICATIONS TERMINAL

(75) Inventors: Emmanuel Le Huerou, Saint Quay Perros (FR); Eric Beaufils, Langoat (FR)

(73) Assignee: ORANGE, Paris (FR)

( * ) Notice: Subject to any disclaimer, the term of this patent is extended or adjusted under 35 U.S.C. 154(b) by 281 days.

(21) Appl. No.: 13/246,733

(22) Filed: Sep. 27, 2011

(65) Prior Publication Data

US 2012/0077458 A1   Mar. 29, 2012

(30) Foreign Application Priority Data

Sep. 27, 2010 (FR) ...................... 10 57753

(51) Int. Cl.
| | | |
|---|---|---|
| H04M 19/04 | (2006.01) | |
| H04L 29/08 | (2006.01) | |
| H04L 12/58 | (2006.01) | |
| H04L 29/06 | (2006.01) | |

(52) U.S. Cl.
CPC ............ *H04L 67/22* (2013.01); *H04L 51/043* (2013.01); *H04L 65/1069* (2013.01); *H04L 67/24* (2013.01); *H04L 67/18* (2013.01)

(58) Field of Classification Search
CPC ... H04L 67/22; H04L 12/5815; H04L 51/043; H04L 65/1069; H04L 67/24; H04L 67/18
See application file for complete search history.

(56) References Cited

U.S. PATENT DOCUMENTS

| | | | |
|---|---|---|---|
| 2003/0065788 A1* | 4/2003 | Salomaki | 709/227 |
| 2004/0161090 A1* | 8/2004 | Digate | H04L 29/06 379/202.01 |
| 2006/0015609 A1 | 1/2006 | Hagale et al. | |
| 2006/0148477 A1* | 7/2006 | Reilly | 455/436 |
| 2010/0329642 A1* | 12/2010 | Kam et al. | 386/280 |
| 2011/0099142 A1* | 4/2011 | Karjalainen et al. | 707/600 |

* cited by examiner

*Primary Examiner* — Pakee Fang
(74) *Attorney, Agent, or Firm* — Knobbe, Martens, Olson & Bear, LLP

(57) ABSTRACT

This information collection module implemented in a first telecommunications terminal comprises means for obtaining non-declarative information representative of usage of at least one first application of said first terminal; and means for communicating said non-declarative usage information to a presence server accessible by a second terminal in order to determine a presence status associated with at least one second application of said first terminal.

16 Claims, 3 Drawing Sheets

MODULE AND A METHOD FOR COLLECTING NON-DECLARATIVE INFORMATION AND IMPLEMENTED BY A TELECOMMUNICATIONS TERMINAL

RELATED APPLICATIONS

This application claims the priority of French application Ser. No. 10/57753 filed Sep. 27, 2010, the entire content of which is hereby incorporated by reference.

BACKGROUND OF THE INVENTION

The present invention lies in the general field of telecommunications networks. It relates more particularly to improving the reachability of the users of terminals that implement a plurality of applications.

In the past, mobile terminals used to have only one telephony function, e.g. a GSM function, native to the terminal.

Recently, with the appearance of intelligent terminals or "Smartphones", it has become easy to install new communications applications, for example for making voice over IP (VoIP) calls.

Such applications provide a new communications line via an Internet connection.

In the present state of the art, the various mobile telephony applications operate in isolated manner, which means they are completely independent, in other words they do not communicate with one another within the terminal.

Consequently, when the user of a terminal is making a telephone call by using the native telephony function of the telephone (e.g. a GSM call), there is nothing to prevent a third party calling the same terminal by using an application of the voice over IP type.

That situation is not satisfactory, since the user is not in practice in a position to answer the second call.

OBJECT AND SUMMARY OF THE INVENTION

One object of the invention is to provide a module and a method enabling a third party to know or discover the usage that a user is actually making of a terminal.

A first aspect of the invention is directed to an information collection module implemented in a first telecommunications terminal, the module comprising:
- means for automatically obtaining non-declarative information representative of usage of at least a first application by the first terminal; and
- means for automatically communicating said non-declarative usage information to a presence server accessible by a second terminal in order to determine a presence status associated with at least one second application usable by said first terminal.

The invention also provides a telecommunications terminal including an information collection module as briefly defined above.

In a particular embodiment, such a telecommunications terminal comprises:
- at least a first application;
- at least a second application; and
- a collection module as mentioned above, said module comprising:
  - means for obtaining non-declarative information representative of usage of the first application; and
  - means for communicating said usage information to a presence server that is accessible by a second terminal in order to determine a presence status associated with said second application.

In another embodiment of the invention, at least one application among the first application and at least one second application is hosted in a remote server and is used remotely by the terminal.

For example, if the second application is a network game application hosted on a remote server on an Internet type communications network, then the application may be used remotely by the terminal via a web browser of the terminal.

Correspondingly, the invention provides an information collection method that is implemented in a first telecommunications terminal, the method comprising:
- a step of automatically obtaining information representative of usage of at least a first application by said first terminal; and
- a step of communicating said usage information to a presence server accessible by a second terminal in order to determine a presence status associated with at least one second application usable by said first terminal.

The terminal implementing the invention may be fixed or mobile, and in particular it may be a computer, a mobile telephone, a personal digital assistant, or a TV set.

The invention is particularly advantageous when the applications in the terminal do not communicate with one another (silo mode); nevertheless, the invention also applies when the applications can communicate with one another.

Thus, in general, the invention proposes using an information collection module to collect information representative of the real usage of applications by the user in order to feed information to a presence server.

It is important to observe that in the present state of the art, presence servers are used to inform third parties of declarative information about the user of the terminal in association with a given application.

For example, presence servers are used nowadays to enable the user of an instant messaging application voluntarily to inform (using so-called "declarative" information) third parties of that user's state of availability for the application (available, busy, . . . ).

However the invention proposes greatly enriching said presence servers by acting in entirely automatic manner to make usage information available to third parties concerning a plurality of applications of the terminal.

For example, the first application in the meaning of the invention may be a mobile telephony application, with the associated usage information representing the fact that a call is or is not set up via that first application; this usage information may also include additional information, for example an identifier of the party communicating via the first application.

In another embodiment, the first application may be an application suitable for generating an alert on the terminal receiving an incoming call, where the associated usage information represents a type for said alert.

In this embodiment, it is thus possible for a third party to know whether the terminal of the user is in vibrator mode or ringing mode, for example.

In another embodiment, the first application may be a messaging application, with the associated usage information representing the fact that a message is or is not being written on the terminal.

Thus, a third party may know whether the user of the terminal is or is not busy writing a message.

In another embodiment, the first application may be a position-locating application, with the usage information then representing the location of the first terminal.

Thus, a third party may discover whether the user of the terminal is, for example, at the office, on the beach, or on the road.

Each of these types of usage information may thus be communicated automatically to a presence server associated with at least one second application of the terminal.

The second application may for example be a voice over IP application or a network game application. In this second example, if the game partners of the user of the terminal find the user is not sufficiently responsive, they may understand that said user is making a call, or busy with some other task (writing a message, probably driving, . . . ).

The collection module of the invention may be incorporated in the second application. For example, the collection module may be incorporated in a voice over IP application that is dynamically installed in the terminal.

In a variant, in a particular advantageous embodiment, the collection module is incorporated in the operating system of the terminal, which collection module provides an API programming interface for second applications (games applications or voice over IP, for example).

In a particular embodiment, the various steps of the information collection method are determined by computer program instructions.

Another aspect of the invention is directed to a computer program on a data medium, the program being suitable for being implemented by a computer, the program including instructions adapted to implement the steps of the information collection method as mentioned above.

The program may use any programming language, and it may be in the form of source code, object code, or code intermediate between source code and object code, such as a partially-compiled form, or in any other desirable form.

Another aspect of the invention is directed to a data medium that is readable by a computer, and that includes instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk, or a flash type memory, such as a USB key.

Furthermore, the data medium may be a transmissible medium such as an electrical or optical signal, suitable for being conveyed by an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

Other characteristics and advantages of the invention appear from the description made below with reference to the accompanying drawings which show an embodiment having no limiting character.

DETAILED DESCRIPTION OF THE DRAWINGS

Figure 1:
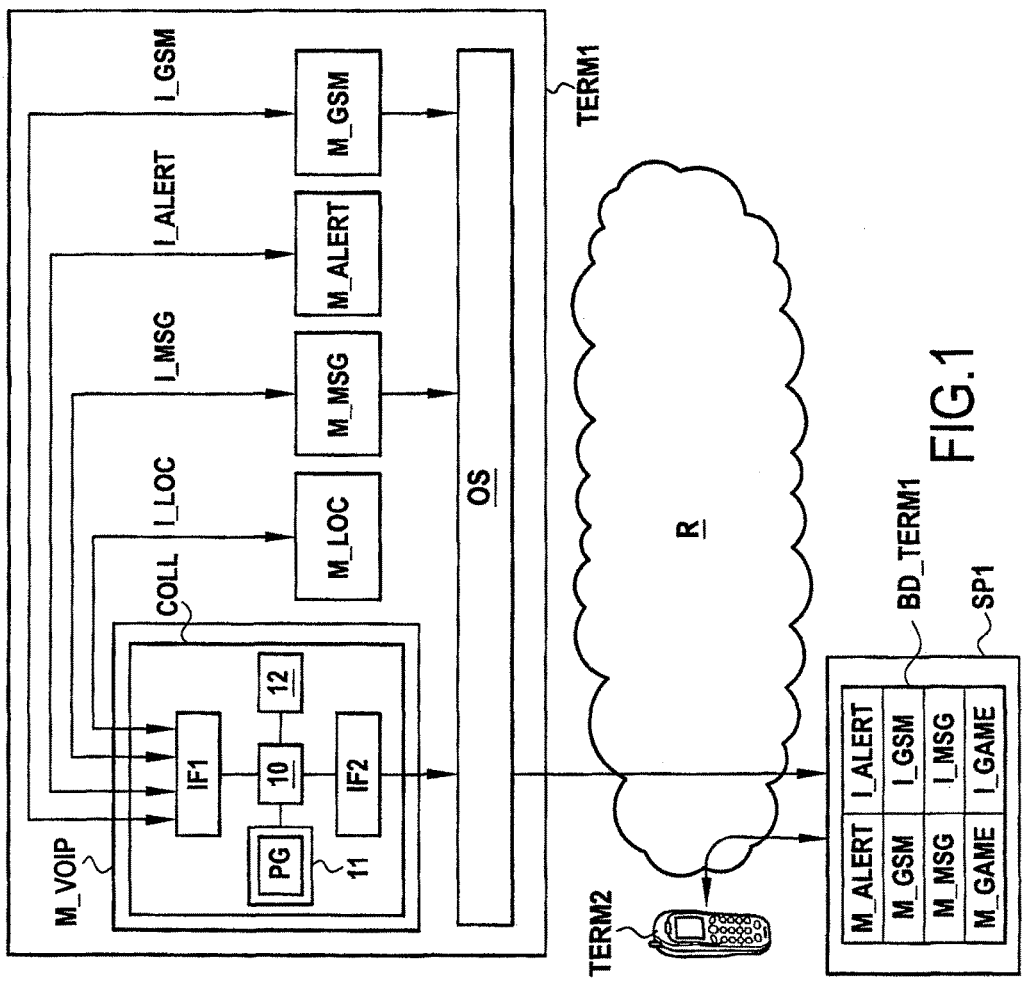
FIGS. 1 to 3 show different embodiments of a collection module and a terminal in accordance with the invention.

With reference to FIG. 1, there can be seen a terminal TERM1 in accordance with the invention.

In this embodiment, the terminal TERM1 is a mobile telephone suitable for communicating via a GSM type telecommunications network R with a presence server SP1, the presence server being consultable at any time by a terminal TERM2.

The terminal TERM1 includes a collection module COLL in accordance with the invention.

In the embodiment described here, the collection module is incorporated in a voice over IP application M_VOIP.

In the embodiment described here, the collection module COLL includes a processor 10, a read only memory (ROM) 11, and a random access memory (RAM) 12. In a variant, the collection module COLL could share these resources with the terminal TERM1.

Figure 4:
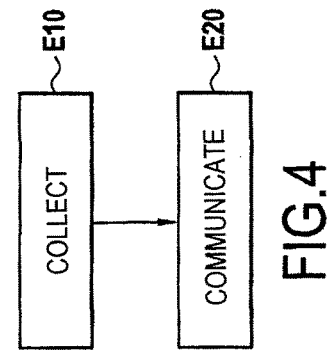
FIG. 4 is a flow chart showing the main steps in an information collection method in accordance with a particular implementation of the invention.

The ROM 11 that is readable by the processor 10 constitutes a recording medium in accordance with the invention, having recorded thereon a computer program PG in accordance with the invention for executing the steps of an information collection method as shown in the form of a flow chart in FIG. 4.

It is assumed that the terminal TERM1 of FIG. 1 has four applications, namely:
  a module M_GSM for mobile telephony in compliance with the GSM protocol, this application being native on the terminal TERM1;
  an application M_ALERT suitable for generating an alert or warning (ringing, vibrator, . . . ) on receiving an incoming call that is received by the module M_GSM;
  a messaging application M_MSG (e.g. of the SMS type); and
  a position-locating application M_LOC.

In accordance with the invention, the collection information module COLL is suitable for obtaining non-declarative information representative of at least one use of each of these applications.

In this example, it is assumed:
  that the communications module M_GSM provides usage information I_GSM representative of the busy state of the application (whether or not a call is set up), and, if allowed by the user of the terminal TERM1, representative of the other party;
  that the application M_ALERT provides the type of alert I_ALERT used by the module (ringing, alert);
  that the messaging module M_MSG provides non-declarative information about whether the user is writing a message; and
  that the locating module M_LOC provides information concerning the location of the user.

In this example, the information I_MSG is obtained from the operating system OS as soon as a message input window has been opened.

In the example of FIG. 1, it should be observed that the collection module COLL obtains this usage information either directly from the applications (I_LOC, I_ALERT), or else from the operating system OS of the terminal TERM1 (for I_MSG and I_GSM).

In this example, the interface of the collection module COLL that is suitable for obtaining this usage information is referenced IF1. Various embodiments may be implemented in order to obtain this information. For example, the collection module COLL may interrogate certain applications on a regular basis (polling mode); it may also subscribe to alerts in order to obtain non-declarative information when such information is available.

In accordance with the invention, the collection module COLL also includes an interface IF2 for communicating this non-declarative usage information to the presence server SP1.

In the embodiment described here, the presence server SP1 consequently includes a database BD_TERM1 containing the non-declarative usage information of the applications of the first terminal, this information being consultable by the user of the terminal TERM2 at any time, and in particular before calling the terminal TERM1.

Figure 2:
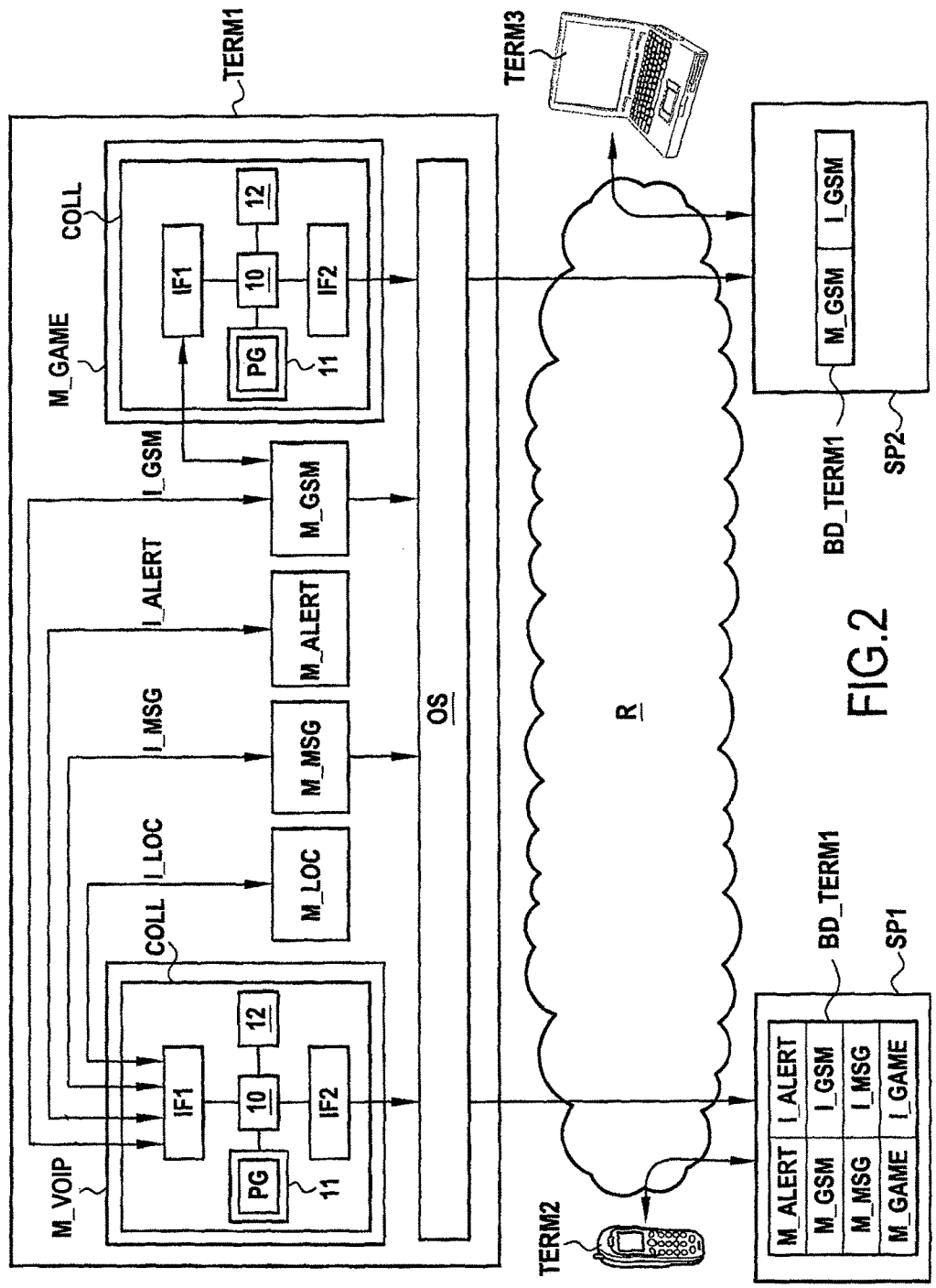

In the embodiment of FIG. 2, it is assumed that the user of the terminal TERM1 has also downloaded a game module M_GAME, which module includes its own collection module COLL.

In this example, this second module is adapted solely to obtaining I_GSM usage information by directly interrogating the GSM communications module.

In this example, it is assumed that the second collection module COLL feeds information to a second presence server SP2.

In a variant, both of the collection modules, as incorporated respectively in the voice over IP module M_VoIP and in the game module M_GAME, may feed information to the same presence server SP1 or SP2.

Figure 3:
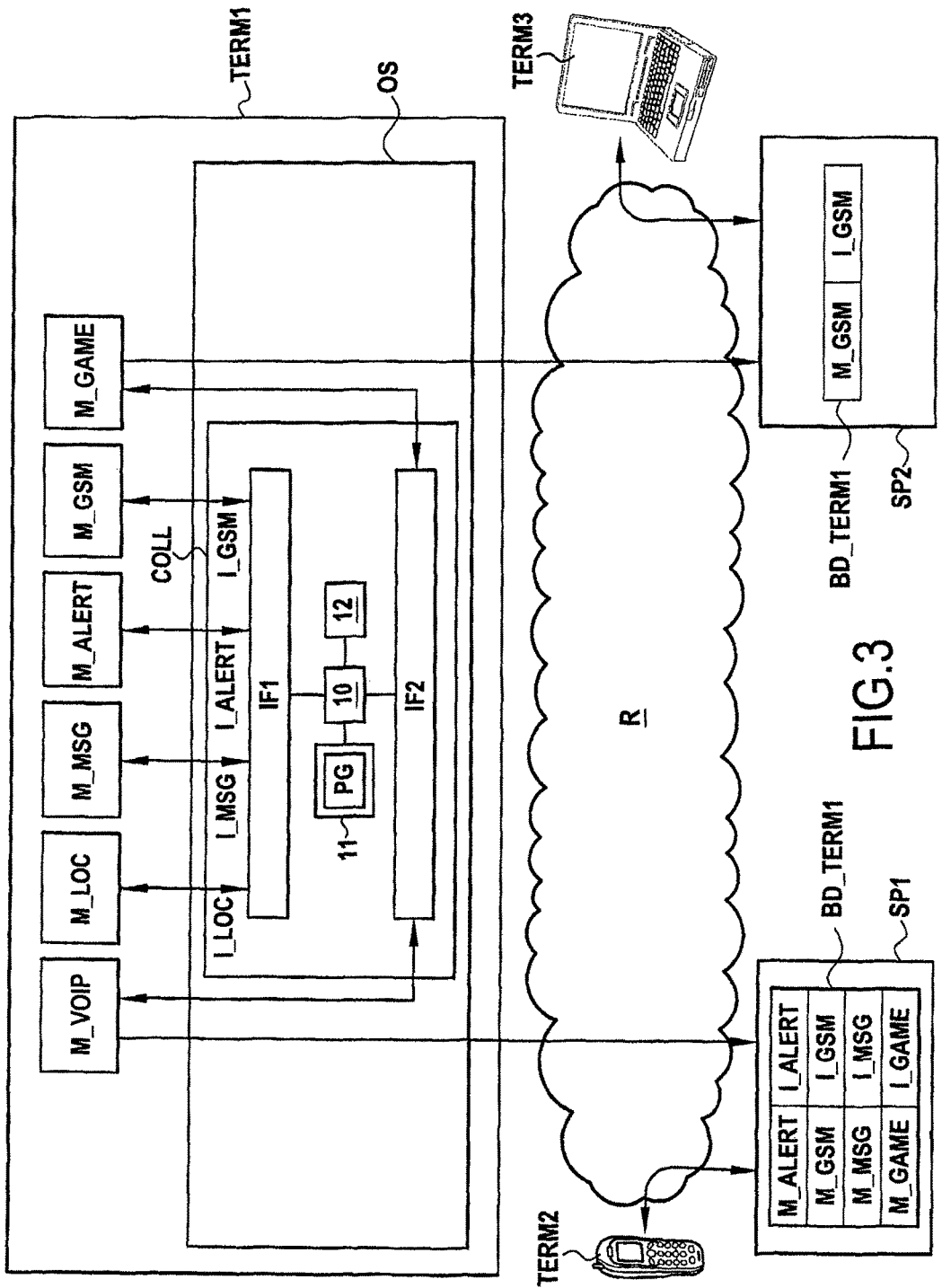

In the example of FIG. 3, the collection module COLL is incorporated in the operating system OS of the terminal TERM1.

In this embodiment, the module provides a programming interface (API) to the developers of the M_VoIP and M_GAME applications.

This embodiment is particularly advantageous since the developer of these applications has no need to be concerned about any other applications implemented by the terminal (position-locating, messaging, native telephony, and alert), with the operating system OS being suitable for obtaining usage information and for making it available to applications via the programming interface.

FIG. 4 shows the main steps of an information collection method in accordance with the invention.

The method comprises two main steps, namely:
- a step E10 of collecting usage information from the first applications, this possibly being done by polling or by notification; and
- a step E20 of communicating this information to the presence server associated with at least one other application, e.g. by means of an API programming interface made available by a collection module of the invention.

In the above-described embodiment, the presence servers SP1 and SP2 are centralized servers. In a variant, the function of the presence server may be distributed among the terminals TERM1, TERM2, TERM3 themselves, these terminals thus forming a peer-to-peer network.

What is claimed is:

1. An information collection module implemented in a first intelligent telecommunications terminal comprising a processor configured to execute instructions which cause the first intelligent telecommunications terminal to:
   automatically obtain non-declarative information representative of current usage of a first application installed in the first intelligent telecommunications terminal by the first intelligent telecommunications terminal, wherein said non-declarative information is obtained directly from said first application; and
   automatically communicate said non-declarative information to a presence server accessible by a second terminal to determine, based on said non-declarative information, a presence status associated with a second application usable by said first intelligent telecommunications terminal wherein said second application is distinct from said first application and wherein said presence status indicates whether or not a user of said first intelligent telecommunications terminal is currently available to use said second application, wherein the first application includes a messaging application, and wherein said non-declarative information indicates whether a message is being written using the messaging application.

2. The information collection module according to claim 1,
   wherein said first application includes an application for setting up a mobile telephone call; and
   wherein said non-declarative information includes information representing whether a call is set up via said first application.

3. The information collection module according to claim 2, wherein said non-declarative information includes an identifier of a contact during communication using said application for setting up a mobile telephone call.

4. The information collection module according to claim 1, wherein said first intelligent telecommunications terminal comprises a mobile telephone;
   wherein said first application includes an application configured to generate an alert upon receiving an incoming call by said first intelligent telecommunications terminal; and
   wherein said non-declarative information includes a type for said alert.

5. The information collection module according to claim 1, wherein said first application includes a position-locating application; and wherein said non-declarative information represents information about a location of said first intelligent telecommunications terminal.

6. The information collection module according to claim 1, wherein said second application comprises a voice over Internet protocol application.

7. The information collection module according to claim 1, wherein said second application comprises a network game application.

8. The information collection module according to claim 1, wherein said information collection module is incorporated in said second application.

9. The information collection module according to claim 1, wherein said information collection module is incorporated in an operating system of said first intelligent telecommunications terminal, said information collection module providing an entry point to said second application.

10. The information collection module of claim 1, further comprising a read only memory and a random access memory.

11. An information collection method implemented in a first intelligent telecommunications terminal, the method comprising:
   automatically obtaining non-declarative information representative of current usage of a first application installed in the first intelligent telecommunications terminal by said first intelligent telecommunications terminal, wherein said non-declarative information is obtained directly from the first application; and communicating said non-declarative information automatically to a presence server accessible by a second terminal to determine, based on said non-declarative information, a presence status associated with a second application usable by said first intelligent telecommunications terminal wherein said second application is distinct from said first application and wherein said presence status indicates whether or not a user of said first intelligent telecommunications terminal is currently available to use said second application, wherein the first application includes a messaging application, and wherein said non-declarative information indicates whether a message is being written using the messaging application.

12. The information collection method of claim 11, wherein the first application includes an application for setting up a mobile telephone call, and wherein the non-declaration information includes information indicating whether a call is set up via the first application.

13. A process in which a computer executes instructions set forth in a computer program stored on a non-transitory computer-readable medium, wherein execution of said instructions by a processor causes said computer to collect information and wherein said computer program comprises:

program code for automatically obtaining non-declarative information representative of current usage of a first application installed in the first intelligent telecommunications terminal by said first intelligent telecommunications terminal, wherein said non-declarative information is obtained directly from the first application, and wherein the non-declarative information comprises information not voluntarily made available to a presence server by a user of said first application; and program code for automatically communicating said non-declarative information automatically to a presence server accessible by a second terminal to determine, based on said non-declarative information, a presence status associated with a second application usable by said first intelligent telecommunications terminal wherein said second application is distinct from said first application and wherein said presence status indicates whether or not a user of said first intelligent telecommunications terminal is currently available to use said second application, wherein the first application includes a messaging application.

14. The process of claim 13, wherein the first application includes an application for setting up a mobile telephone call, and wherein the non-declaration information includes information indicating whether a call is set up via the first application.

15. A non-transitory recording medium encoded with a computer program that when executed by a computer causes information collection, the computer program comprising:

program code for automatically obtaining non-declarative information representative of current usage of a first application installed in the first intelligent telecommunications terminal by said first intelligent telecommunications terminal, wherein said non-declarative information is obtained directly from the first application; and program code for automatically communicating said non-declarative information automatically to a presence server accessible by a second terminal to determine, based on said non-declarative information, a presence status associated with a second application usable by said first intelligent telecommunications terminal wherein said second application is distinct from said first application and wherein said presence status indicates whether or not a user of said first intelligent telecommunications terminal is currently available to use said second application, wherein the first application includes a messaging application, and wherein said non-declarative information indicates whether a message is being written using the messaging application.

16. The non-transitory recording medium of claim 15, wherein the first application includes an application for setting up a mobile telephone call, and wherein the non-declaration information includes information indicating whether a call is set up via the first application.

* * * * *